United States Patent [19]

Holloway et al.

[11] Patent Number: 5,521,909
[45] Date of Patent: May 28, 1996

[54] FRAME RELAY MANAGEMENT SYSTEM

[75] Inventors: Mike Holloway, Stittsville; Wade Neville, Almonte; Mark Tooker, Kanata; Glenn Brauen, Ottawa, all of Canada

[73] Assignee: Newbridge Networks Corporation, Kanata, Canada

[21] Appl. No.: 278,927

[22] Filed: Jul. 22, 1994

[51] Int. Cl.$^6$ .......................... H04L 12/56; H04Q 11/04
[52] U.S. Cl. ................. 370/54; 370/60; 370/61; 370/85.13; 370/94.3
[58] Field of Search .................. 370/53, 54, 58.1, 370/58.2, 58.3, 60, 60.1, 61, 79, 82, 83, 85.1, 85.13, 85.14, 94.1, 94.2, 94.3, 99; 379/268, 271, 272, 273; 340/825.02, 825.03, 826, 827, 825.06, 825.07, 825.17, 825.18

[56] References Cited

U.S. PATENT DOCUMENTS

| | | | |
|---|---|---|---|
| 5,088,091 | 2/1992 | Schroeder et al. | 370/94.3 |
| 5,144,622 | 9/1992 | Takiyasu et al. | 370/85.13 |
| 5,237,566 | 8/1993 | Brand et al. | 370/94.3 |
| 5,253,161 | 10/1993 | Nemirovsky et al. | 370/60 |
| 5,297,137 | 3/1994 | Ofek et al. | 370/60 |
| 5,361,259 | 11/1994 | Hunt et al. | 370/85.13 |

*Primary Examiner*—Alpus H. Hsu
*Attorney, Agent, or Firm*—Marks & Clerk

[57] ABSTRACT

A data transmission network includes a plurality of data processing devices for connection to local data sources. The data processing devices assemble data packets from the local sources into frame relay packets. A plurality of interconnected network nodes are connected to the data processing devices. Point-to-point frame relay links (FRLs) are established between nodes of the network. Frame relay switches installed at the nodes for switch frame relay packets between successive frame relay links through the network. Frame relay paths (FRPs) are established between endpoints of the network using a plurality of successive established frame relay links.

8 Claims, 5 Drawing Sheets

FIG. 1

| | | | |
|---|---|---|---|
| PATH-END A : | ND633/A3-1 | DATA | SAVE |
| PATH-END B | ND744/A3-A-1 | T1 | CANCEL |

NAME
PRIORITY ⟳ 3
RECOVER ⟳ REROUTE
RAPID: ⟳ DO NOT RESERVE ALTERNATE PATH
OPTIMIZE: ⟳ OPTIMIZE AFTER REROUTE
USERLABEL 1: ⟳ MAY USE OR AVOID
USERLABEL 2: ⟳ MAY USE OR AVOID
USERLABEL 3: ⟳ MAY USE OR AVOID
USERLABEL 4: ⟳ MAY USE OR AVOID

FR DLCI AT ENDPOINT A: 100
FR DLCI AT ENDPOINT B: 12
COMMITTED INFORMATION RATE (CIR): 2356000
COMMITTED BURST SIZE (Bc): b/0000 BITS
EXCESS BURST SIZE (Be): 8000 BITS
CONNECT ⟳ USING CONNECT BUTTON    DISCONNECT: ⟳ USING DISCONNECT BUTTON

FAMILIAR BUTTONS.....

FRAME RELAY MANAGEMENT SYSTEM

BACKGROUND OF THE INVENTION

This invention relates to frame relay, and more particularly to an arrangement for implementing frame relay in a network comprising, a plurality of nodes interconnected by communications circuits.

It is known to link Local Area Networks via multiplexers over, for example, T1 circuits. For example, Newbridge Networks Corporation MainStreet® 3600/45 multiplexers can be bridged to Ethernet LANs via Newbridge MainStreet® 8230 bridges. One of the major strengths of the Newbridge 4602 network management system is the rapid set-up of connections (or paths) through a network using a simple point-and-click paradigm. The end user selects the two endpoints and issues a "connect" request. The connect request causes the 4602 system to optimally route the call through the network using the physical resources available; Underlying this concept is a database system that holds an abstraction of the objects making up the network (nodes, cards, ports, links, etc.) and a process (called the BandWidth Allocator, or BWA) that searches this abstraction for available bandwidth and sends appropriate messages to real network elements to configure and connect the path. The supporting features in the 4602 system are well documented in the applicant's literature. In such a prior art configuration, however, the connection paths correspond to actual physical circuits.

Frame relay is a new and simplified packet switching technique specified in CCITT recommendations I.122 and Q.922, and ANSI documents T1.602 and T1.606, which allows for many paths to share the same physical bandwidth. End-to-end user paths are known as Frame Relay Paths (FRPs). Frame relay is designed to replace the older and theoretically slower X.25 service.

The manual set-up of an FRP is accomplished in a number of steps and is time-consuming and prone to error. At each network element (or node), the frame relay streams/backbones/pipes that overlay the physical network must be established. This overlay-network forms the highways that frames are allowed to ride on. This is accomplished using frame relay switch cards, which perform high speed frame relay switching. Frame stream circuits on these cards are cross-connected to physical network resources (e.g., data ports, primary rate timeslots, T1/E1 etc.). Cross connected to physical network resources are access ports to these services.

A locally unique address must be assigned to each endpoint of the frame relay path. These addresses are called DLCIs (Data Link Connection Identifiers). There may be many logical paths terminating at each access endpoint.

For each frame-relay path (FRP), the connectivity over the frame relay streams must be established by visiting each node and making appropriate local DLCI cross connects on the frame relay switches to allow frames to switch from one frame relay pipe to another. DLCIs are locally significant at each frame stream circuit only and may change at each switch along the way. Hence, there may be many DLCI cross-connects connects for each FRP. This set-up is very time consuming and must be done for each FRP. Since the DLCIs used at each switch must be locally unique on each frame stream and since there can be up to one thousand FRPs per frame stream, managing DLCI numbers becomes very difficult if done manually.

SUMMARY OF THE INVENTION

An object of the invention is to permit existing point-and-click networking equipment to take advantage of the flexibility offered by frame relay.

Accordingly the present invention provides a data transmission network linking local area networks, comprising: a plurality of data processing devices connected to local data sources on said local area networks, said data processing devices defining endpoints in said transmission network and assembling said packets from said local sources into frame relay packets; a plurality of interconnected networks nodes located between said endpoints; physical multiplex circuits interconnecting adjacent said network nodes, and interconnecting network nodes with endpoints adjacent thereto; each said network node including interface means connected to respective said physical multiplex circuits, and frame relay switch means connected between said interface means for switching frame relay packet; means for establishing a succession of logical frame relay links (FRLs) between said endpoints through said transmission network, each said frame relay link extending directly between a pair of frame relay switch means of adjacent said nodes, or between one said endpoint and a said frame relay switch means of a said node adjacent said one endpoint; means for establishing a frame relay path (FRP) between said endpoints of said network over a plurality of successive established frame relay links such that said frame relay paths ride on said frame relay links; and said frame relay switch means switching frame relay packets between successive frame relay links through the network.

In a preferred embodiment, the network nodes are Newbridge MainStreet® 3600 multiplexers and the frame relay switch means comprise high capacity frame relay engines FREs linked by a high bandwidth bus. Preferably, the high capacity links are interconnected by a FASTbus™ wiring hub as described in our co-pending application no. entitled "Fault Tolerant Wiring Hub".

The data processing devices may be bridges for connection to local area networks, such as Ethernets.

The invention provides for the creation of a frame relay overlay network onto physical devices, which allows many physical paths to ride inside a single physical link. The system allows selection of endpoint DLCIs, finds the optimcal route, and then automatically keeps track of the DLCIs used at each switch.

A key aspect of the invention thus involves introducing two new types of path, frame relay links (FRLs) and frame relay paths (FRPs). A frame relay path is a set of connections between links that together form a data path between two circuits (logical or physical). Frame relay links (FRLs) are paths in the sense that standard path set-up procedures, as employed in the Newbridge Mainstreet® 4602 Network Management system are followed to get them connected. Other paths can also use these paths as links. The collection of FRLs can itself be considered a network of links. FRPs are restricted to ride only on connected FRLs. To implement this layering concept requires the use of self linking data structures.

The implementation of FRLs and FRPs also requires a consideration of what to model as endpoints. FRLs are implemented by modeling actual endpoint circuits on FRE cards and other physical devices and allowing the existing BWA process to make the physical connections. DLCIs are modeled as attributes of the FRP and are chosen by the user. Checks are made at connection time to ensure end to end uniqueness of DLCIs used. Hence, the FRP path data structure has pointers to the FRLs used, and stores the DLCIs used at all of the connections along the way. With this arrangement, frame relay network management is fully integrated with the rest of the system management applications.

Frame relay networks can thus be managed in a natural and efficient manner using modified existing equipment. To effect this extension, new objects are abstracted (modeled) and a large number of so-called "frame relay paths" are efficiently routed and re-routed. In fact, an additional layer of abstraction is inserted into the paradigm to support the efficiency required.

The invention will now be described in more detail, by way of example only, with reference to the accompanying drawings, in which.

Figure 1:
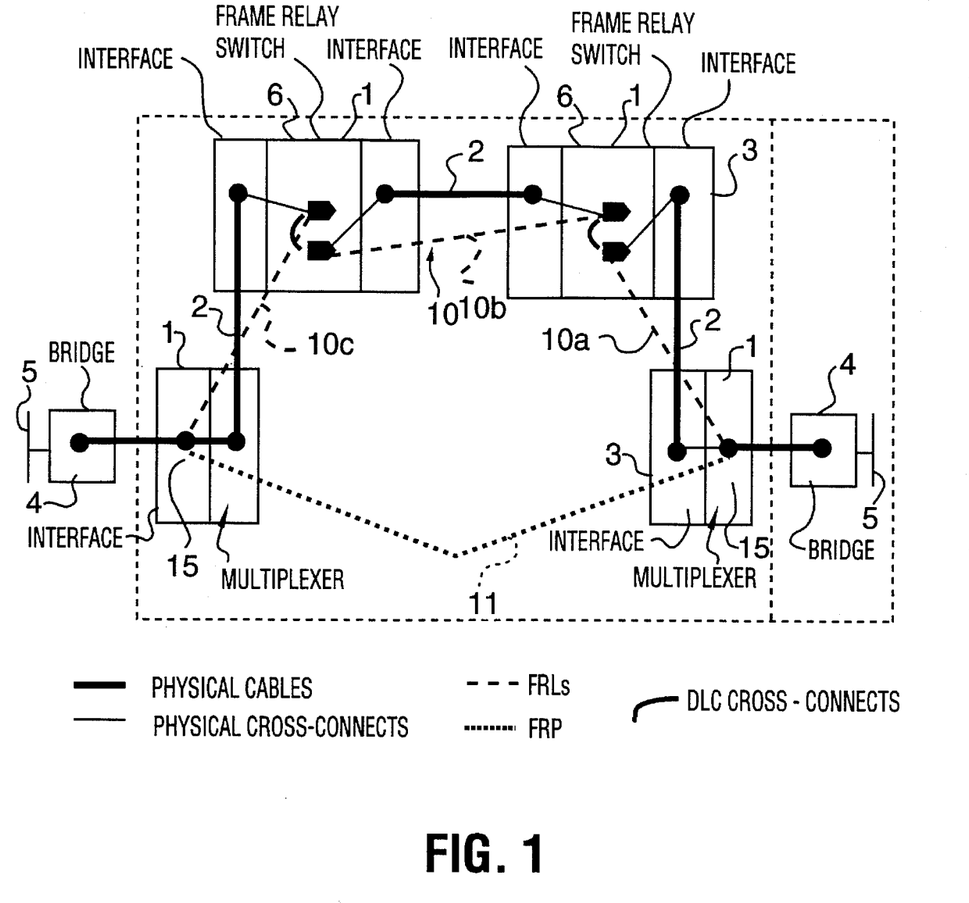
FIG. 1 is a diagram showing a frame relay path through a network.

Referring to FIG. 1, a plurality of Newbridge MainStreet® 3600 multiplexers 1 constituting network nodes in a data transmission network are connected over 1.54 Mbs T1 physical multiplex circuits 2 to Newbridge MainStreet® 8230 Ethernet bridges 4, which are connected in turn to respective Ethernet Local Area Networks 5. The multiplexers 1 and bridges 4 contain T1 interface cards 3 for interfacing with the T1 physical circuit 2. Although physical circuits 2 are shown as T1 circuits, use can be made of any other suitable type of physical circuit, such as T1, E1, DS3, Data, V.35 PRI, X.21 PRI, V.35 AGG, X.21 AGG, Voice (LGS, LGE), Subrate, ADPCM, Fractional, Mixed Fractional, Mixed, Custom, Custom Control/Logging, LAN Segment, LAN Drop Cable, HSM (3645).

Such an arrangement allows communication to be established between devices connected to the Ethernet LANs 5 from a single node using the point-and-click concept implemented in the Newbridge 4602 network management system.

Frame relay switch cards 6 are fitted into card slots in the backplane of the mulitplexers 4 to permit the establishment of frame relay paths 11 over the network using the same paradigm.

FIG. 1 illustrates how a new FRP (frame relay path) 11 is established. First, FRLs 10 (frame relay links) are established through the network between endpoints 15 through frame relay switch cards 6 using the commercially available Newbridge Networks corporation 4602 Network Management system 20 converted to a single network node. Once the FRLs 10 have been set up between the two endpoints, the frame relay path 11 is set up in a typical manner using the 4602 network manager, but using the available logical FRLs as if there were physical circuits. Thus, the frame relay packets travel over a series of logical frame relay links 10a, 10b 10c, which may be different for successive packets, between two endpoints 15 defining a frame relay path. A novel feature of the invention is that the FRLs remain available for other paths to use them as links. Different FRPs can therefore share the same FRLs.

When the user is setting up a FRP from a timeslot, he cannot connect an FRP unless the FRL starting on this circuit is connected. In other words, FRPs starting at other timeslots consumed by a super rate FRL will stay in the "Waiting for resources" state until such time as there is a FRL starting at that timeslot. The user will be warned when creating a FRP from a timeslot where no FRL is currently configured.

Figure 2:
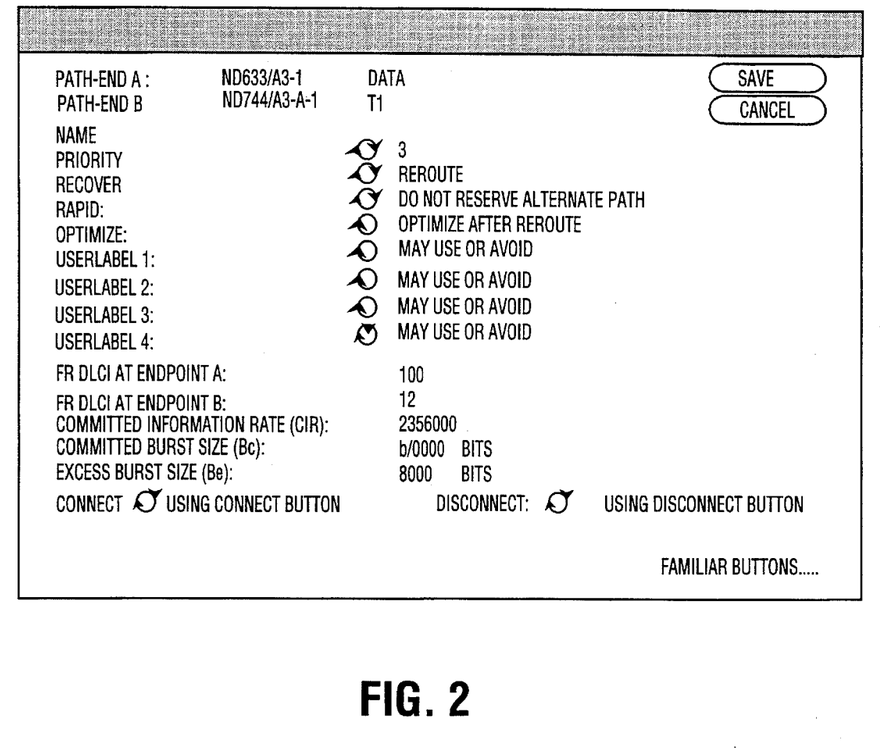
FIG. 2 shows a screen illustrating a sample path configuration.

FIG. 2 illustrates a configuration screen that the user sees when setting up a frame relay path. The user in this case would be the network manager operating from a workstation at a single node. The top right corner displays the window title, "Config Frame Relay Path".

The Path-end A/B fields are used for the user to paste in the endpoints for the Frame Relay Link. The Name of a FRP can be from 1 to 33 characters. The Priority of an FRP is an integer between 1 and 16, where 1 is the highest priority call. The default priority is 3.

The Recovery cycle item allows the user to choose whether the FRP should attempt to reroute when there is a failure in which reroute may be attempted. The choices are "Reroute" and "Do not reroute". The default is "Reroute".

The RAPID cycle item allows the user to choose whether there should be an automatic alternate path reserved. For frame relay paths, this field is frozen at "Do not reserve alternate path", since RAPID is not supported for FRPs.

The Optimize cycle item allows the user to choose whether the FRP should reroute independently to a more optimal route if any of the FRLs that it rides is rerouted. The two choices are "Optimize after reroute" and "Do not optimize after reroute". If the affirmative is chosen for the FRP, the FRP is connected, and one of the FRLs is rerouted, the routing algorithm is invoked to determine if a better route exists for the FRP. If one is found, the FRP is disconnected and re-connected on the more optimal route. This functionality directly parallels that of subrate/ADPCM paths implemented in the NP4 release of the 4602. The default choice is "Do not optimize after reroute".

The UserLabelx cycle items are identical to those on all path forms and their functionality is the same as on existing 4602 systems. An FRP can be set up over a connected FRL if one of the conditions in the Table I is met for each of the custom configuration fields:

TABLE I

| Custom Setting on Frame Relay Link | Compatible Custom Settings On FRP |
| --- | --- |
| Must use | Must use, May use or avoid |
| Must avoid | Must avoid, May use or avoid |
| May use or avoid | May use or avoid |

The two FR DLCI at Endpoint x fields are used for typing in the endpoint DLCIs for the PVC being set up. They are blank by default but must be entered before a path can be saved. Valid DLCIs are positive integers in the range 16–1007. DLCI validity is checked when the Save button is pressed. Invalid DLCIs are indicated by bringing up an alert to this effect. Active DLCIs are flagged by an alert that allows the user to continue.

The Committed Information Rate (CIR) is the negotiated (between network provider and user) rate of information that the FRP will be guaranteed to carry under normal traffic conditions. It is a measurement of speed in bits per second. CIR is an integer in the range 0–1,984,000 (31 DS0s). The default is 64000. If CIR is 0, Bc must be 0.

The Committed Burst Size (Bc) is the maximum number of bits of user data that the network commits to transfer on the FRP over the committed rate measurement interval (Tc). Tc is not configurable and is calculated as Bc/CIR (the time interval over which the user may transfer Bc committed bits). Bc must be an integer in the range 0 to 2147483647 ($=2^{31}-1$). Its default is 64000.

The Excess Burst Size (Be) is the maximum number of bits in excess of the Bc that the network will attempt to transfer on the FRP over the Tc interval. These excess frames will have their DE bits set. All data over Bc+Be arriving in any Tc interval is discarded. Be must be an integer in the range 0 to 2147483647 ($=2^{31}-1$). Its default is 64000.

The "Connect" and "Disconnect" items at the bottom are identical to existing functionality and are well known. When the Connect button is pressed on a config link or config path form, it changes to a Disconnect button, the Delete button disappears, and the List Link/Pathpoints button appears.

When the Connect button is pressed or time of day set-up occurs, the system attempts to set-up the "call", and a message is displayed at the bottom of the config form (if it happens to be open). Some of the possible messages are:

Ok, path is connected

ERROR: Internal problem. Try repeating action.

NOTE: Set-up delayed due to network comm faults

NOTE: Set-up delayed until resources available

TOO EXPENSIVE: Path exceeds maximum number of hops

Connection DELAYED: cannot be made now because a required node is not ready.

Connection DELAYED: cannot be made now because a required card is not ready.

Connection DELAYED: cannot be made now because a required device (or DTU) is not ready.

Connection DELAYED: cannot be made now because a required circuit is already in use.

Connection DELAYED; cannot be made now because a system problem occurred.

The speed saved for this path is no longer valid.

Path not connected—timeout occurred.

The Disconnect button is the reverse of the Connect button. When pressed, any resources used by the FRL or FRP are freed up. The same restrictions for subrate/ADPCM links and paths apply (e.g., if there are FRPs riding an FRL, the GUI will stop you from disconnecting the FRL with an alert telling you that the FRPs must be disconnected first). Messages are also generated at the bottom of the screen in response to disconnect requests. No new messages are required for FRE support.

FRL or FRP call status is displayed in the upper right corner of the panel.

The List Linkpoints/Pathpoints button causes the window to resize showing the now familiar "call" points subwindow. The list displays the equipment involved in the call and the loopback capabilities of each piece of equipment listed. For FRPs, all equipment for all FRLs traversed is exploded out (i.e. no reference to the FRL is mentioned). This behaviour follows the existing behaviour for subrate/ADPCM links/paths.

Once a FRL is connected, only the Name, Reroute, Empty Link Priority, Priority Range, CIR Range, Booking factor, and Link Protocol Failure Recovery items may change. For a connected FRP, only the Name and Recovery fields may change.

If any of the allowable changes occur, the Save button reappears. If Save is pressed while the link or path is connected, the new values are stored, but the Delete button does not reappear. A frame relay link or path can only be deleted when the link is disconnected.

FSC parameters can change while the FSC is connected. Changes can occur via NMTI or by Object=>configure.

Since CIR, Bc, and Be are used in routing decisions, the system will not allow these parameters to change while an FRP is connected. However, the user could change these via an NMTI session with the card. This is viewed as a mistake and will be trouble ticketed on the card affected.

Figure 3:
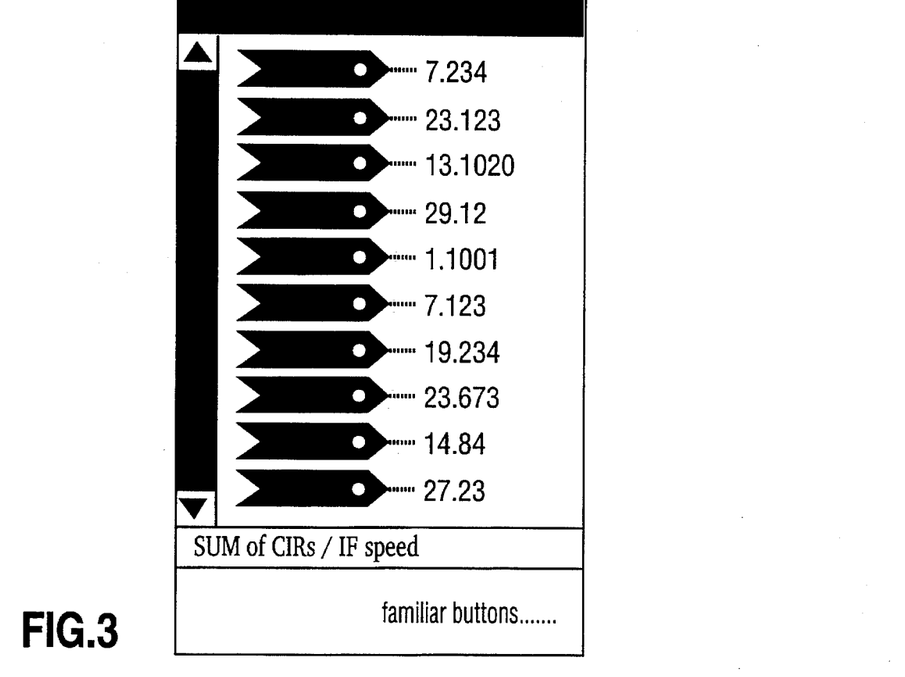
FIG. 3 shows a screen showing the DCLIs for a FSC (Frame Stream Circuit)

Zooming in (double clicking) on a FSC (Frame Stream Circuit) will open a drawing showing the DLCIs connected on that FSC. FIG. 3 shows a facsimile of this drawing.

In FIG. 3, the numbers inside the new DLCI icon (e.g., 24, 123, ...) are the DLCIs used up on that FSC (Frame Stream Circuit). The lines on the right show what that DLC is cross connected to. This is for information purposes only, and is not a selectable object from this drawing. The actual text printed represents the FSC/DLCI that the DLC on the left is connected to on the card. DLCIs on a FSC are sorted in ascending order on the DLCI number. The scroll bar on the left is used to show more connected DLCIs if there are any.

Displaying the DLCs has primary benefit in the highlight path application. The user can now follow FRPs directly from end to end. DLCs have their background shaded using the same gray used for coloring SRMs.

The status circle on the DLCs shows a combination of where the connection was made and its status. The object window should be checked in situations where the color alone is ambiguous (e.g., purple with a black dot). The possibilities for the status circle are:

white circle indicates the DLC was connected by the 4602.

white circle with a-black dot indicates an NMTI connected DLCI.

green circle with a black dot indicates a 4602 connection disconnected in NMTI purple circle with a black dot means an abnormal NMTI affected situation has occurred. Possible meanings:

NMTI connection with a loopback or busyout 4602 connect disconnected and then reconnected elsewhere via NMTI.

DLC configuration changed via NMTI on a 4602 connect

The current total CIR usage on the FSC is shown as it relates to the interface speed of the FSC/FRL. This ratio gives an idea of how booked the FSC/FRL is.

Route selection for FRLs needs to take into account ones density with FSCs configured for 64 kb/s transport bandwidth. When a FSC is connected to a primary rate circuit, inversion is turned off. The HDLC protocol itself guarantees that there will not be more than 5 1's in a row but there could be an arbitrary number of 0's in a data frame. A stream of 0's could be corrupted by a JB7 T1 (or cause a loss of framing on a transparent T1). Therefore, this would only be routed over Els, PRIs or B8ZS T1s.

The unused columns are filled with 1's when a FSC configured for 56 kb/s or less is connected (even if the HDLC stream is inverted at the FRE card). This means that one's density is guaranteed for FSCs with transport bandwidth of less than 64 kb/s. Therefore, these could be connected onto any primary rate link.

The HDLC protocol provides random framing; FRLs can be routed over data cables which do not provide byte alignment.

Given this background, the rules for setting up FRLs are the following:

1) Use of primary rate cables . . .

| Transport bandwidth desired | Allowed link types |
|---|---|
| 64 kb/s | E1, PRI, B8ZS T1 |
| 56 kb/s or less | anything |

2) Use of data cables . . .

A data cable may be used to carry a FRL. The transport bandwidth of the FRL must exactly match the bandwidth of the data cable.

Routing of FRL calls with RAPID set to "Reserve alternate path" has various restrictions. For example, doing multi-hop RAPID requires OOS signalling to be propagated to the ultimate endpoints. Path search will avoid situations where this is not possible.

The following criteria are used in the path search for FRLs to carry an FRP:

FRL interface speed must be greater than CIR for the FRP

FRLs used cannot be busied out

An FRL used for a given FRP must be able to accommodate a burst size of (Bc+Be) over the measurement interval T. This means that the interface speed of the FRL must be greater than or equal to (Bc+Be)/T. Therefore, the interface speed of the FRL must be greater than or equal to ((Bc+Be)*CIR)/Bc. The maximum burst which is possible during the measurement interval T is, however, limited by the interface speeds of the FSCs containing the endpoint DLCs. Therefore, the interface speed of the FRL must be greater than or equal to:

$$MIN((Bc+Be)CIR/Bc, IS_{ep1}, IS_{ep2})$$

where $IS_{ep1}$ and $IS_{ep2}$ are the interface speeds of the FSCs containing the endpoint DLCs.

the sum of the CIRs for the FRL must be less than or equal to the interface speed of the FRL times the booking factor. Booking factor must be a number greater between 1 and 2000 (allowing for both under and overbooking of FRLs)

When the 4602 must select between two routes through the network that have equal cost and load, it will choose the route that uses the least number of frame relay switching devices from end to end.

FRPs may be routed over FRLs which have status "Connected (Protocol OOS)".

The cost of connecting an FRL is calculated as:

$$nDS0* \cdot cable_i$$

where $cable_i$ is the cost of the $i^{th}$ cable traversed by the FRL. This is essentially the same calculation that is currently done for super-rate calls and ADPCM links.

The cost associated with connecting an FRP across an FRL is calculated as:

$$(CIR/(FRL\ interface\ speed*FRL\ booking\ factor))*FRL\ cost$$

This cost is used because the maximum value for .CIRi on a specific FRL is:

$$FRL\ interface\ speed*FRL\ booking\ factor$$

It is desirable that a load balancing function be used such that traffic load is distributed over a set of connected FRLs as evenly as possible. Given two routes which have equal costs, number of hops and which would require equal priority bumping of existing calls, the system uses a biasing function to decide between the routes.

Let $$USAGE = \cdot CIRi/FRL\ interface\ speed$$

where $\cdot CIRi$ is the sum of the CIR values for all connected DLCs on the FRL. The system will determine for each possible route $$MAX\_USAGE = max(USAGE1, USAGE2, \ldots, USAGEn)$$

where USAGEi is the USAGE value for the ith FRL traversed by the FRP. Then given two possible routes, A and B, the 4602 will choose:

A if $MAX\_USAGE_A < MAX\_USAGE_B$

B if $MAX\_USAGE_A > MAX\_USAGE_B$ either A or B (coin toss) if $MAX\_USAGE_A = MAX\_USAGE_B$ Rerouting follows the same rules as subrate links and paths. Rerouting refers to when rerouting is a possibility because of some internal failure on the "call".

Table II shows the possible combinations of what may happen for equipment failures on an FRL.

FRLs have derived priority (based on highest priority FRP riding them or empty link priority) and can be bumped. FRPs have a priority and can be bumped.

TABLE II

| Equipment failure combos | Reroute FRL ON | Reroute FRL OFF |
|---|---|---|
| Reroute FRP ON | attempt reroute FRL | Mark FRL "Connected (down)" |
| | if FRL reroutes OK, FRP stays with FRL (exception: optimize for FRP is turned on and there exists a more optimal route for the FRP). if FRL reroute fails, mark FRL as "Waiting for resources", reroute FRP independently. if FRP reroute fails, mark FRP as "Waiting for resources". | Reroute FRP independently. if FRP reroute fails, mark FRP as "Waiting for resources". |
| Reroute FRP OFF | FRPs are tied to FRL they are brought up on. if FRL reroute fails, mark FRL as "waiting for resources and attempt to reroute FRP anyway (i.e. ignore what is specified). If reroute fails, mark FRP as "Waiting for resources" | FRPs are tied to FRL they are brought up on. Mark FRL as "Connected (down)" Mark FRP as "Connected (down)". |

With this arrangement VBN (Virtual Backbone Partitioning) of the FSC (Frame Stream circuit) is also possible.

Figure 4:
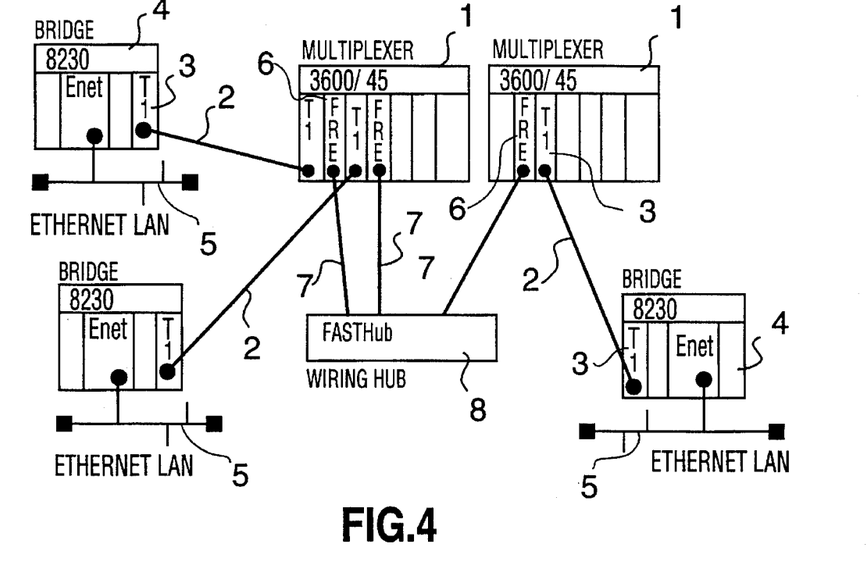
FIG. 4 is a block diagram of a data transmission network incorporating a fasthub wiring device according to one embodiment of the invention.

FIG. 4 shows a preferred embodiment of the invention. In this embodiment, the frame relay switch cards (FRE) cards 6 and in the form of Frame Relay engines (FREs) are interconnected via high speed links 7, for example fiber optic links, having a data throughput in excess of 100 Mbs, and FASThub 8, which is a wiring hub for interconnecting the high speed links 7 and described in our co-pending application Ser. No. 08/278,328, entitled "Fault Tolerant Wiring Hub", the contents of which are herein incorporated by reference. The frame relay engines 6 perform the packet switching operations required to implement frame relay.

FASTbus 8 is used to provide the center of a frame relay network. User data is assembled into frame relay packets on the 8230 little Ethernet Bridges 4 as in the previous embodiment. The data packets are switched in the network nodes by the FRE cards 6, such that they travel to other FRE cards 6 via Fasthub 8, and are eventually disassembled into user data on another bridge 4. This arrangement considerably enhances the speed of operation of the frame relay network.

The fastbus 8 resource is handled in a manner similar to the set-up of the basic frame relay paths.

Figure 5:
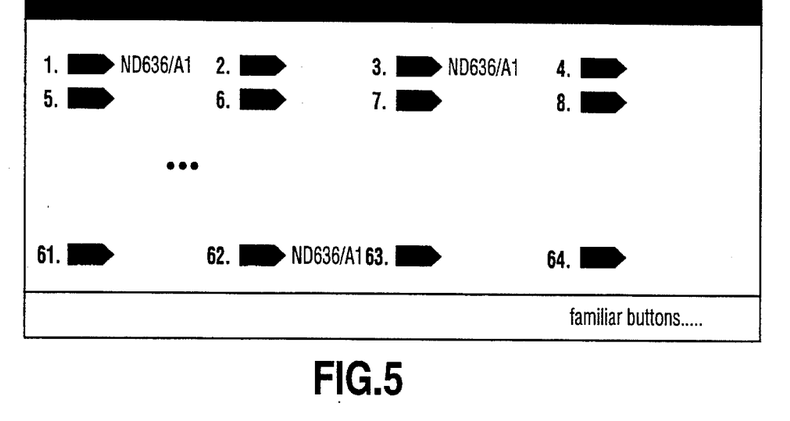
FIG. 5 is a drawing of a fastbus resource screen.

As shown in FIG. 5, when the user double-clicks on the FASTbus Resource, or selects it and performs Object=>Open, a drawing appears.

Each of the 64 FASTbus circuits shown in FIG. 5 represents the endpoint of a potential logical link across the FASTbus to another FRE card. The number to the left of each circuit is the station ID for a FRE card, which should be unique for the FASTbus. The health of these circuits depends on the polling that constantly takes place between FRE cards over the FASTbus.

In Highlight->Equipment Status (normal) mode, the circuits are colored and automatically named as shown in Table III:

TABLE III

FB Circuit

| Status | Description | Color Name |
| --- | --- | --- |
| Self | this is the FRE's own station ID Self | gray |
| Connected | a FRE card is actively Nd/shf,slot polling using this station ID, and the card is found in the 4602 database | green |
| Connected | a FRE card is actively polling Card not found using this station ID, but the card is not found in the 4602 database | green |
| Disconnected | no FRE card has been polling using Nd/shf,slot this station ID, but there is a card in the 4602 database which has this card # | red |
| Disconnected | no FRE card has been polling using <blank> this station ID, and there is no card in the 4602 database which has this card # | gray |

If the FASTbus resource status is 'Not connected to FASTbus' or 'Busied Out', all of the circuits in the above drawing are colored gray, have a blank name, and the following message is written in the bottom window panel (to the left of the standard buttons): "Warning: not active on FASTbus."

Object->Configure is grayed out on the main menu when a FASTbus circuit is the selected object. The only variable attribute of these circuits other than their status is their names, which are automatically generated as described above.

There is no FASTbus circuit drawing, so double-clicking on a FASTbus circuit produces only an alert. The menu command Object->Open is grayed out when a FASTbus circuit is the selected object.

FASTbus cables show the connectivity between FRE cards 6 and a FASTbus 8. Before the 4602 will allow two FRE cards to communicate with each other across a FASTbus 8, they must both be joined to the same node via at least one FASTbus cable each.

The joining of a FRE card 6 and a node on the map causes the FRE card to be configured with a station ID and a node. The card then uses these numbers to establish and maintain communications across the FASTbus 8 with the other FRE cards 6 connected to the same FASTbus 8.

Whether the system user draws one or two cables between a single FRE card 6 and a node has no effect on the way paths are routed across the FASTbus 8. However, it is recommended that the user always draw both cables, to match the actual physical cables. This results in better diagnostic information being communicated to the user in the form of cable coloring.

Figure 6:
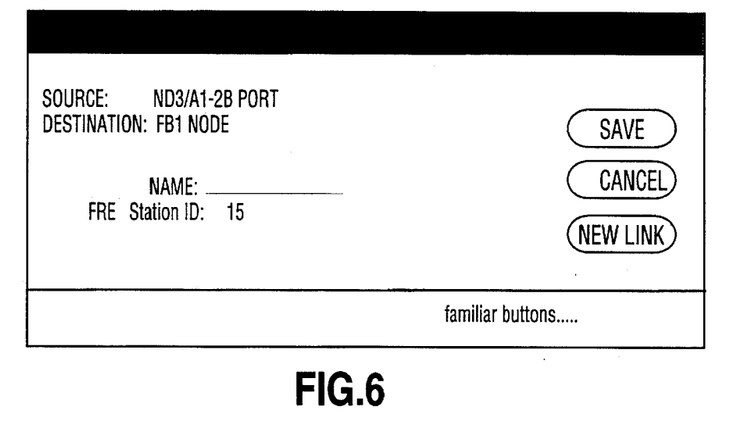
FIG. 6 shows the Fastbus config cable screen.

To create a FASTbus cable, the user selects either a FRE card's FASTbus port or a node and performs the main menu command New->Link. When the other endpoint is pasted in, the user hits 'Proceed', and the New Link form changes into a Config Link form, as shown in FIG. 6.

This includes a name field the user may enter and save any string from 0 to 15 characters long. The name is blank by default.

This screen also shows the station ID, which is really a card attribute, but is configured here because it is only valid while the FRE card is connected to a node. This number must be unique among all FRE cards connected to the same node. When the config form appears, the field is filled in with the first unused number in the range 1 . . . 64. The user may change the number to another value, but the save operation will be refused with an alert if the number is outside of the range 1 . . . 64 or if the number is not unique.

When the new cable has been saved, the station ID and the node Number are both sent to the actual frame switch card. With these two numbers, the card can begin to establish communications with other frame switch cards connected to the same FASTbus. For each of the other FRE cards with which communications are established, a FASTbus circuit will have its status changed to "Connected".

After being initially configured, the station ID associated with a FASTbus cable cannot be changed; it is frozen on the Config form. If the user adds a second FASTbus cable between the FRE card's other port and the node, the station ID appears on the config form, but is frozen with the value configured previously on the other cable.

Figure 7:
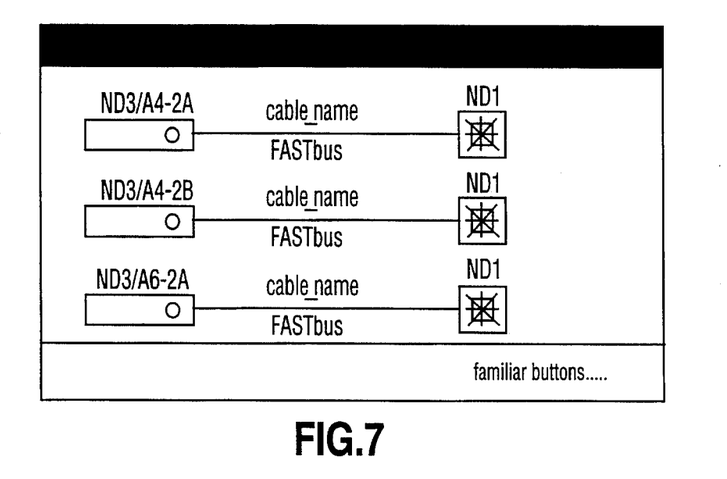
FIG. 7 shows the Fastbus cable link drawing.

FASTbus cables appear on the network map inside of link groups. When a link group containing FASTbus cables is expanded, a drawing appears as shown in FIG. 7. In this example, there are two cables from one FRE card to a node, and one cable from another FRE card in the same 36xx node to the same 36120.

FRE cards' frame stream circuits (FSCs) function exactly the same as FSCs on FRE cards with respect to FRLs, as described above. Because the FRE is a double-data bandwidth card, attempting to end an FRL with a data rate greater than one DS0 on a FRE card may fail due to not enough bandwidth being available on either of the two synchronous streams on the 36xx node backplane. In this case, the FRL goes into state 'Waiting for Repairs'.

It is permissible but not necessarily advisable to create an FRL between two FRE cards on the same FASTbus. The system will examine the FRL while doing the path search, but will normally choose the FASTbus. The FASTbus will not be chosen if the load on the FRL is lower than the FASTbus. The load calculation includes the CIR of the path currently being searched.

The user may not specify a FRE's FASTbus circuit as an endpoint for an FRL. Attempting to do so results in an alert, and the New->Link operation will not proceed.

A FASTbus is considered by the path search if the following requirements are met:

the FRE cards both have a 'FASTbus connection OK' status for their FASTbus Resources;

each FRE card reports that the other card can be reached via the FASTbus (i.e. their corresponding FASTbus circuits have status;

the sum of CIRs of cross connects directing traffic across the FASTbus from all of the FASTBus's FRE cards, plus the CIR of the new FRP, does not exceed the product of the FASTbus ring's configured booking factor times the effective FASTbus bandwidth. For purposes of routing, the effective FASTbus bandwidth will be considered 80 Mbits/second.

Figure 8:
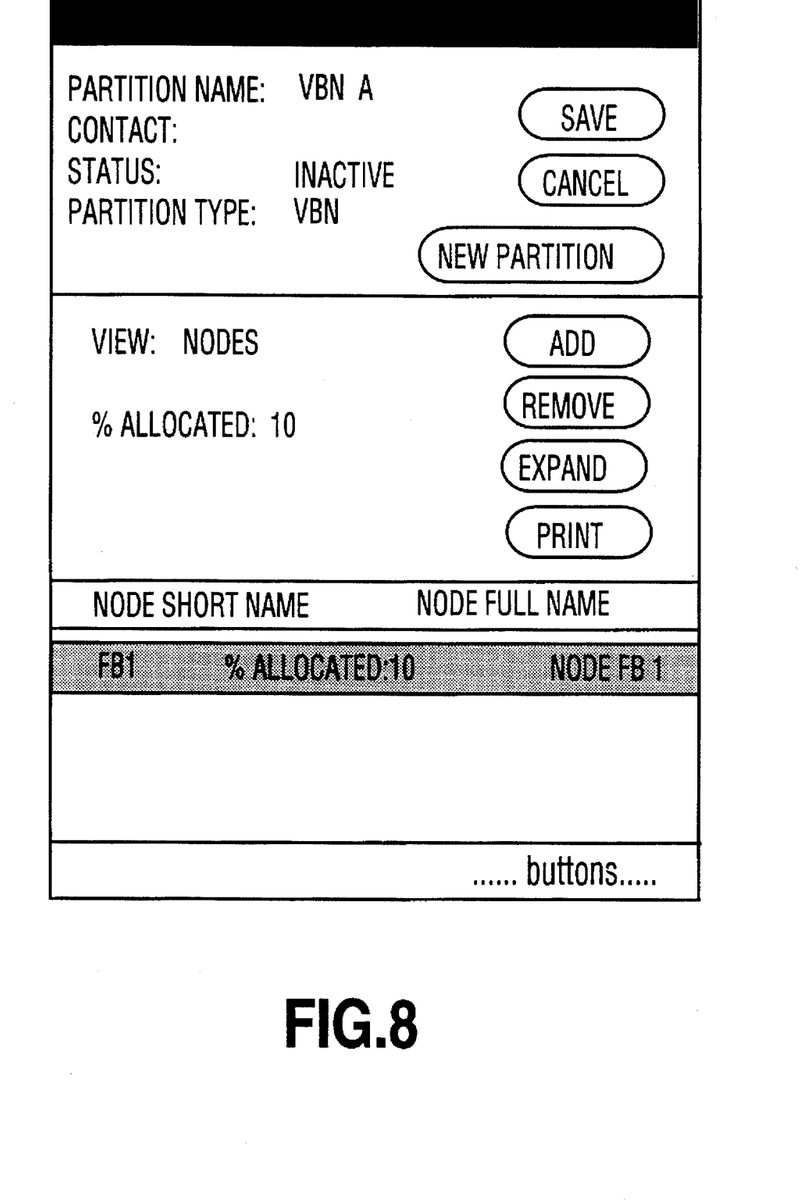
FIG. 8 shows a Fastbus network with Partitioning

The node with the FAStbus is not normally partitionable; however, partitioning can be provided in the manner shown in FIG. 8.

The service provider user can add a node to multiple VBN partitions. When this has been done, each FRE card which has one or more FR circuits in one of the partitions to which the 36120 belongs can use the FASTbus to send traffic to any other FRE card with FR circuits in the same partition.

When a node is moved into a partition, the service provider specifies the percentage of FASTbus bandwidth which will be available to the service user. This percentage, P%, allows the service user to set up FRPs using the 36120 node, as long as the sum of CIRs does not exceed this figure:

P%*36120 booking factor%*FASTbus effective bandwidth

FIG. 8 shows the Config Partition form when a 36120 node either has been just added or else has been selected from the list of partitioned nodes.

The '% Allocated' field only appears in the middle panel when a 36120 node has just been added or else is selected from the list part of the window. Its default value when a 36120 is first added to the partition is 10.

The % allocated value also appears in the node list itself for each partitioned 36120 node. No further information appears in the list of partitioned objects for 36120 nodes when the user hits the 'Expand' button.

The sum of percentages for all service users of a FASTbus cannot exceed 100%. If the service provider specifies a higher percentage than is available when partitioning the 36120, an alert will appear when 'Save' is pressed, and the operation will be refused. The alert gives the percentage of FASTbus bandwidth that is still available.

If a service provider lowers the % allocation for a partition and hits 'Save', a check will be carried out of all FRPs in the partition which are currently crossing the 36120 node. If the sum of CIRs of the FRPs is such that the new, lower percentage would be exceeded, a trouble ticket is issued against the 36120 node.

Similarly, if the service provider configures a 36120 node such that its Booking Factor is lowered, and this causes one or more VBN partition users to be in a state of partition violation regarding their % allocation for the 36120, a trouble ticket is issued against the 36120 node for each partition, which is in violation.

In order to determine the sum of CIRs on a 36120 node by each service user, a service provider must log in to the 4602 as a service user, and perform List->Paths on the 36120.

FRE cards can be added and configured from one location. The frame relay enhancement can be easily added to the network map. Notifications in the form of map color changes, alarms, and trouble tickets, appear to monitor the health of FRE cards and the health of FRE-to-FRE logical connections across a frame relay engine 6. FRE cards may be added to various types of node, including the Newbridge MainStreet® 3600 Bandwidth Manager, 3645 Bandwidth Manager, 3645 E3 Bandwidth Manager, 3645 DS3 Bandwidth Manager, 3624 T1 Channel Bank 3612 Narrow-band Mux, 3604 Frame Assembler/Disassembler, 3630 Primary Rate Mux, 3606 Little Mux, 8100 LAN Bridge/Router, 8230 Little Ethernet Bridge, 5633 DACS, 5632 Custom Node, 5638 SNMP (Custom LAN) Node, 4602 Network Station, 4601A Network, Manager.

We claim:

1. A data transmission network linking local area networks, comprising:

a plurality of data processing devices connected to local data sources on said local area networks, said data processing devices defining endpoints in said transmission network and assembling data packets from said local sources into frame relay packets;

a plurality of interconnected network nodes located between said endpoints;

physical multiplex circuits interconnecting adjacent said network nodes, and interconnecting network nodes with endpoints adjacent thereto;

each said network node including interface means connected to respective said physical multiplex circuits, and frame relay switch means connected between said interface means for switching frame relay packets;

means for establishing a succession of logical frame relay links (FRLs) between said endpoints through said transmission network, each said frame relay link extending directly between a pair of frame relay switch means of adjacent said nodes, or between one said endpoint and a said frame relay switch means of a said node adjacent said one endpoint;

means for establishing a frame relay path (FRP) between said endpoints of said network over a plurality of successive established frame relay links such that said frame relay paths ride on said frame relay links; and said frame relay switch means switching frame relay packets between successive frame relay links through the network.

2. A data transmission network as claimed in claim 1, wherein said establishing means are located at a single network node, whereby the entire frame relay network can be managed from a single node.

3. A data transmission network as claimed in claim 2, comprising a workstation at said single node displaying network management screens, and wherein said frame relay paths can be established by point-and-click operations from said single node.

4. A data transmission network as claimed in claim 2, wherein said frame relay switch means comprise frame relay engines capable of interchanging frame relay packets at high speed, said frame relay engines being mutually interconnected by a high bandwidth bus so as to increase throughput of the network.

5. A data transmission system as claimed in claim 4, wherein the high bandwidth bus is in the form of a wiring hub.

6. A data transmission system as claimed in claim 1, wherein the data processing devices are LAN bridges.

7. A data transmission system as claimed in claim 1, wherein said network nodes with frame relay switch means therein are incorporated in a virtual backbone network partition.

8. A data transmission system as claimed in claim 1, further comprising display means for displaying a map of a frame relay network established between said frame relay switch means.

* * * * *